Aug. 4, 1959     M. E. COOK     2,897,974
SERVICE TRAY ADAPTED FOR USE IN AUTOMOBILES
AND IN OTHER RELATIONS
Filed April 16, 1956

INVENTOR.
Maurice E. Cook

Attorney.

2,897,974

SERVICE TRAY ADAPTED FOR USE IN AUTOMOBILES AND IN OTHER RELATIONS

Maurice E. Cook, Kalamazoo, Mich.

Application April 16, 1956, Serial No. 578,509

1 Claim. (Cl. 211—74)

This invention relates to service trays adapted for use in automobiles and in other relations and which may be formed as a unit of plastic.

The main objects of this invention are:

First, to provide a service tray which is adapted for use in automobiles and in other relations and is stable when resting on a curved surface or on a flat surface.

Second, to provide a service tray having these advantages which may be formed as a unit of plastic.

Objects relating to details and economies of the invention will appear from the description to follow. The invention is defined and pointed out in the claim.

A preferred embodiment of the invention is illustrated in the accompanying drawing, in which.

The embodiment of my service tray illustrated is formed of molded plastic. The tray comprises a rectangular bottom 1, side walls 2—2 and end walls 3—3. The side and end walls merge at the corners as shown at 4 and are provided with downwardly projecting leg members 5 and 6 which also merge at the corners which results in inwardly facing angled legs.

The legs support the bottom and the side and end walls in spaced relation from the table or other support on which the tray is positioned so that the tray may be conveniently grasped.

Figure 3:
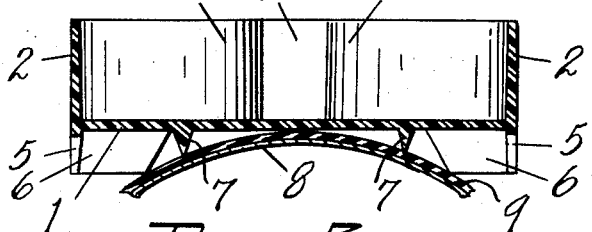
Fig. 3 is a transverse section on a line corresponding to line 3—3 of Fig. 2 illustrating the tray as supported upon a curved surface.

The tray is provided with a pair of downwardly tapered and downwardly projecting supports 7 disposed in laterally spaced relation to each other and to the side and end walls and being of less height than the legs but coacting therewith in supporting the tray on a transversely curved surface as 8, see Fig. 3. This adapts the tray to be positioned on the transversely curved raised portion of the floor of an automobile which is found in many automobiles and provided so as to receive the transmission shaft of the automobile thus permitting the lowering of the main portion to the floor of the automobile.

As shown in Fig. 3, when the tray is so positioned the supports 7 which are desirably pointed engage the yieldable covering 9 on the curved surface 8 and prevent slipping of the tray laterally on the curved surface.

Figure 1:
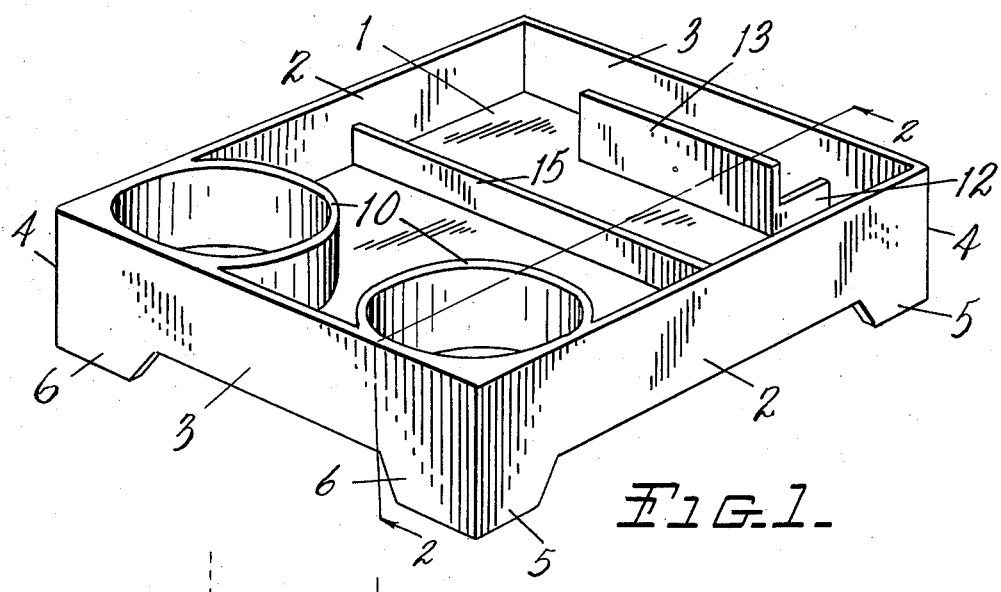
Fig. 1 is a perspective view of a service tray embodying my invention.
Figure 2:
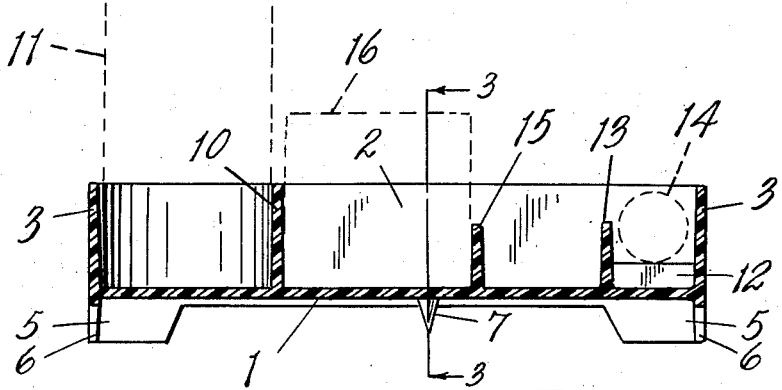
Fig. 2 is a vertical longitudinal section on a line corresponding to line 2—2 of Fig. 1, objects being indicated in the tray by dotted lines.

The tray is provided with a pair of holders 10 desirably circular as illustrated and merging into the ends and side walls, or, otherwise stated, portions of the holders are constituted by the adjacent ends and side walls. These holders are designed to receive receptacles such as a thermos bottle indicated by dotted lines 11 in Fig. 2, or cups, tumblers or the like. The other end of the tray is provided with a rack comprising rests 12 spaced laterally from each other and from the side walls and merging into the end walls.

The inner wall 13 of the rack extends between the rests 12 and its ends are spaced from the side walls so as to provide finger openings for grasping items such as a flashlight which may be placed in the rack, conventionally indicated at 14. Between the holders 10 and the rack is a transverse partition 15 desirably of less height than the side and end walls. This partition provides compartments in which articles may be placed as is indicated by the dotted lines 16 in Fig. 2.

In the preferred embodiment of my invention illustrated the tray is formed as an integral molded unit. I have illustrated the upper portion of the tray, several parts above the bottom as being tapered upwardly to permit drawing from the mold and the parts below the bottom as being tapered downwardly to facilitate drawing from the mold. This mold may be a two part mold.

The trays embodying my invention may be very rapidly and economically produced and are very strong and rigid even when the walls and other parts are quite thin.

Having thus described my invention, what I claim as new and desire to secure by Letters Patent is:

A unitary service tray formed of plastic and adapted for use in automobiles and in other relations and comprising a rectangular bottom, upstanding side and end walls integral therewith and having downwardly projecting leg members at the ends thereof, said side walls and leg members merging at the corners of the tray, and downwardly projecting intermediate supports spaced laterally from each other and spaced from the side and end walls and being of less height than the legs to coact therewith in stabilizing the tray upon a transversely curved surface.

References Cited in the file of this patent

UNITED STATES PATENTS

| Number | Name | Date |
|---|---|---|
| 489,019 | Lauderdale | Jan. 3, 1893 |
| 2,502,229 | Miller | Mar. 28, 1950 |
| 2,514,109 | Walsh | July 4, 1950 |
| 2,597,460 | Eberhardt | May 20, 1952 |
| 2,672,182 | Gwin et al. | Mar. 16, 1954 |
| 2,738,872 | De Boton | Mar. 20, 1956 |
| 2,790,547 | Sutton | Apr. 30, 1957 |